: 3,475,218
SOLVENT CLEANING SYSTEM
Archie P. Torrenzano, Springfield, Mass., and Richard T. Pincince, Fergusen, Mo., assignors to Monsanto Company, St. Louis, Mo., a corporation of Delaware
Filed Nov. 8, 1965, Ser. No. 506,818
Int. Cl. B08b 3/08
U.S. Cl. 134—10                                    4 Claims

ABSTRACT OF THE DISCLOSURE

Process for removing polymeric materials from processing equipment involving contacting such materials with a tetrahydrofuran solvent while agitating so as to effect solution of the polymeric materials in the solvent.

---

This invention relates to a novel system for the removal of residual polymeric contaminants from vinyl halide polymerization equipment. More specifically, this invention is directed to a solvent system for the removal of accumulated polymeric contaminants in polymerization reactors, reflux condensers and analogous processing equipment associated therewith.

The chemical industry has long been plagued with continuing build-up of residual polymeric materials in polymerization reactors and associated equipment after the removal of the charge from the reactors. These residual contaminants produce problems in quality and overall production. The quality problems materialize when contaminants flake off the side of the equipment surfaces and become intermixed with a present polymerization charge whereby the final polymerized product quality is inferior due to the off-grade contaminant material. Additionally, the buildup of residual contaminants in the process equipment reduces heat transfer capability, process control and emergency venting capability. Hence, frequent equipment cleaning is necessary, thus leading to reduced operating efficiency and overall production.

Historically, this type of equipment has been cleaned manually by removing the reactor from service and sending a cleaning crew into the reactors with a jackhammer or the like to manually chip the residual polymeric contaminants from the inner surfaces of the vessels. Such procedure is quite undesirable for the following reasons:

First, manual chipping is excessively time consuming and causes further decreases in production capacity; ergo, a loss of profits. Secondly, additional manpower is required for chipping thereby adding to overhead and producing a still further reduction in profits. Thirdly, the use of such an archaic cleaning method always leads to the possibility of defects on the inner surfaces of the reactors, and these defects, by reducing the smoothness of the reactor surfaces, compound the problem of residual polymer build up.

Various attempts have been made to resolve the aforedescribed problem of polymeric build up in the polymerization equipment. One such attempt is described in U.S. Patent 3,070,548, to Brooke. Brooke defines a system for the removal of polymeric materials from processing equipment, especially in the petroleum refining field. Lower diolefin hydrocarbons and vinyl compounds are cited as typical examples of polymers that leave residual build up which he removes with a solution of methylene dichloride and kerosine. The methylene dichloride-kerosine solution does not dissolve the polymer to a greater extent, but loosens the bond at the equipment surface whereby the contaminants fall off and/or are easily removed by mechanical means.

A further attempt for the removal of polymer build up is taught in the Thompson U.S. Patent 2,880,121. Thompson directs his efforts to removal of polypropylene residue by oxidizing the polypropylene and then dissolving the oxidized polypropylene in an organic solvent having a boiling point of over 200° F.

None of the aforedescribed procedures for polymeric build up removal have been found satisfactory. It is therefore an object of this invention to provide a successful and feasible means for removal of residual polymeric materials from polymerization vessels.

A major object of the present invention is to provide a method for removing polymeric build up from vinyl halide polymerization vessels.

A further object of this invention is the removal of polymeric build up in vinyl chloride reaction vessels by contacting said polymeric build up with a solvent, removing the solvent contaminant solution from the reactor, repurifying the solvent and recycling for further cleaning use.

In the drawings, FIGURE 1 is a graphical representation of the effect of agitator speed on the dissolution rate of various contaminants when subjected to a 95% tetrahydrofuran solvent.

Figure 1:
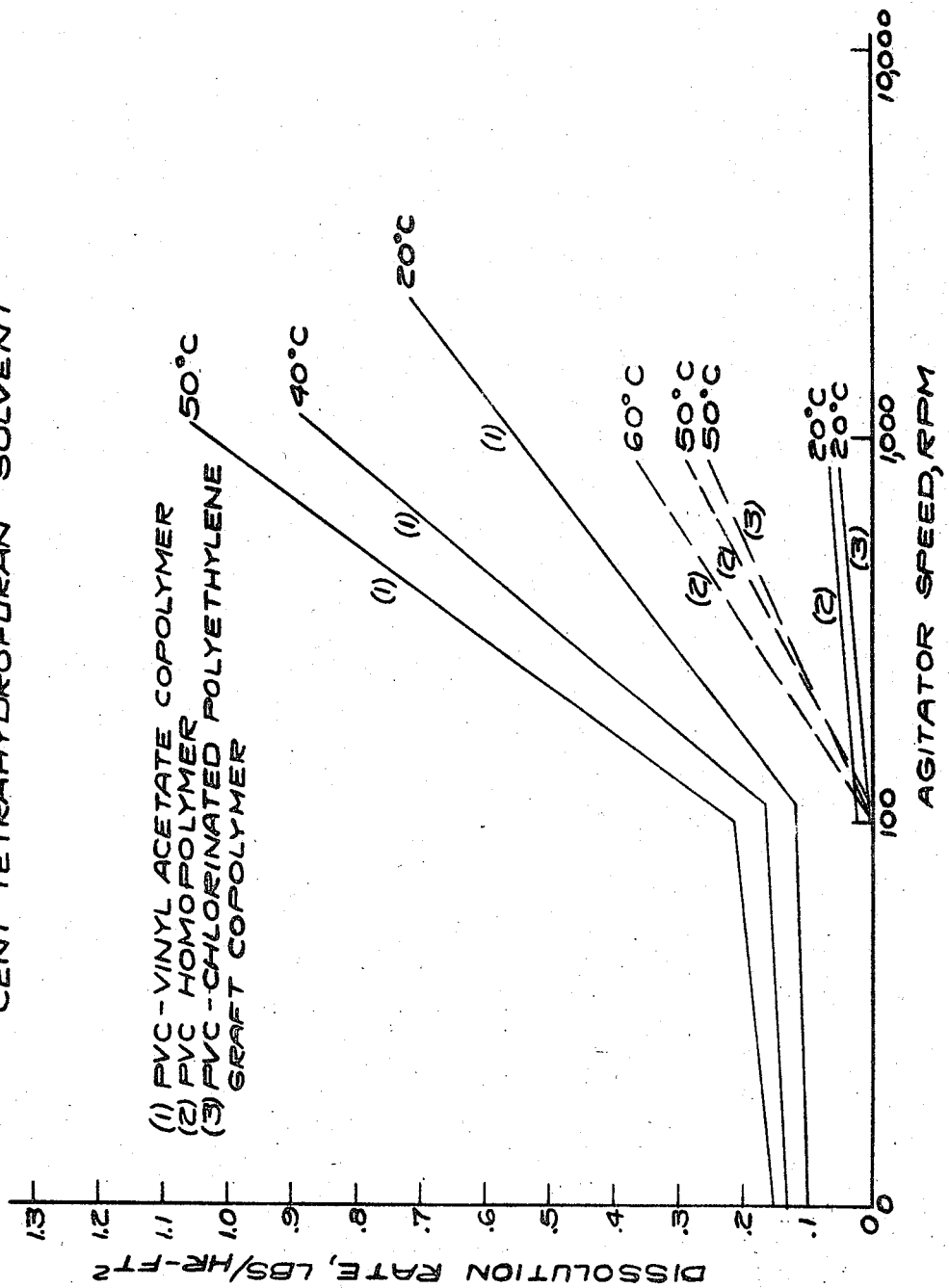

The present invention generally involves filling a vinyl halide reaction vessel and/or reflux condenser with a tetrahydrofuran solvent solution; holding the solution in the vessel for a time sufficient to dissolve polymer build up on the inner walls of the reactor while subjected to continued agitation; discharging the solvent containing dissolved contaminants from the reactor; subjecting said solvent to distillation to remove the dissolved contaminants, and recycling the solvent to the cleaning system.

Tetrahydrofuran is a known solvent for vinyl halide polymers and copolymers and especially for vinyl chloride polymers and copolymers of vinyl chloride and other monomer copolymerizable therewith. While the group of monomers copolymerizable with vinyl chloride is not so specifically limited, vinyl acetate, vinyl laurate, alkyl acrylates, alkyl methacrylates, alkyl maleates, alkyl fumarates, vinylidene chloride, acrylonitrile, vinyl cetyl ether, vinyl lauryl ether, vinyl myristyl ether, are suitable. Also, however, the copolymers may be a graft copolymer in which case the one of the constituents will be polymeric and the other monomeric. Exemplary are polyethylene, chlorinated polyethylene, chlorosulfonated polyethylene, copolymers of ethylene and propylene, copolymers of ethylene and vinyl acetate and others too numerous to mention. The selection of tetrahydrofuran as a solvent for the present invention was not, however, attributed to the knowledge of the prior art. Numerous solvents are known for dissolving vinyl halides such as for example, trimethylene oxide, tetramethyl urea, dimethyl acetamide, tetrahydrofuran, cyclohexanone, cyclopentanone, cyclohexene oxide, diethyl acetamide, diethyl formamide, dimethyl formamide, tetrahydropyran, ethylene oxide, methyl ethyl ketone, dioctyl phthalate, dioxane and many others. These solvents vary, however, in dissolution strength with the molecular weight of the compound to be dissolved. By virtue of the use of tetrahydrofuran, the present invention is successful for removing both homopolymer and copolymer contaminants having low or high molecular weights. All the solvents listed were not tested for various reasons, e.g. availability, cost, ease of handling, recovery of the solvent, etc. Particular solvents that were tested include dioctyl phthalate, methyl ethyl ketone, cyclohexanone, dimethyl formamide, dimethyl acetamide, tetrahydrofuran, dioxane and combinations thereof. Among these solvents, tetrahydrofuran, methyl ethyl ketone and cyclohexanone were considered superior with tetrahydrofuran by far being the superior of these three.

The present invention is accomplished by pumping a tetrahydrofuran solvent into the polymerization reactor. The tetrahydrofuran must, of necessity, be of at least 90% purity (with approximately 10% water) and prior to its ingress into the reactor is preheated to approximately 80–100° C. A sufficient amount of solvent is pumped into the reactor to completely fill the reactor and when a reflux condenser is associated therewith to fill the condenser to the point where the solvent level just covers the top tube sheet. The solvent is then agitated to attain a turbulent flow within the reactor for a period of from one and one-half to two and one-half hours and preferably two hours. When a reflux condenser is employed, the solvent solution is continuously recycled through the reactor and condenser during the cleaning operation. During this stewing or agitation period, the polymeric contaminants within the polymerization reactor are dissolved by the tetrahydrofuran solution. The tetrahydrofuran-contaminant solution is then transferred to a recovery operation wherein the contaminants are removed from the solvent and the solvent is readied for additional cleaning use. Prior to solvent recovery, however, a single charge of solvent has sufficient dissolution potency for two cleaning operations.

In solvent recovery, a problem confronted was the distillation of sufficiently pure tetrahydrofuran suitable for further cleaning and precipitation of polymer. The distillation is conducted under vacuum and is carried out in two steps. A flash distillation is the first step and approximately 75% of the tetrahydrofuran from the contaminant containing solution is recovered. The overhead product is an 94–96% azeotrope of tetrahydrofuran and water.

Live steam is then directly injected into the remaining contaminant containing solution. During the steam injection, a point is attained where sufficient water is mixed with the solvent solution to precipitate the polymeric constituents dissolved therein. Continued distillation recovers all the remaining tetrahydrofuran, which is combined with the tetrahydrofuran portion removed during the flash distillation operation. The combined purity of recovered solvent is 92–94%. Residual materials in the still, i.e. water, a very minor amount of tetrahydrofuran and precipitated contaminants are discarded to waste.

In the above description of the process of the present invention, several factors are critical. The three most important factors are tetrahydrofuran-water solution concentration, agitation, and dissolution rate of contaminants. The degree of agitation of the solvent during the solution of contaminants from within the processing equipment greatly influences the rate at which the contaminants are dissolved by the solvent. It has been determined that the critical point about which the efficiency of dissolution revolves is the transition point from laminar to turbulent flow. Very interestingly, over a range of temperatures from 20° C. to 50° C. the dissolution rate reported as pounds/ hour/sq. ft. increased almost exponentially immediately upon attaining turbulent flow of solvent within the processing equipment. This effects is reported pictorially in FIGURE 1, and is set forth in more detail in the following example.

EXAMPLE I

Experiments were conducted on a laboratory scale to correlate the effect of agitation on the dissolution rate on polyvinyl chloride homopolymer and copolymer. A solvent consisting of a 95% tetrahydrofuran-water solution was agitated in a 2000 milliliter beaker by means of a variable speed stirrer with (1) a 2″, 3-blade marine impeller and (2) a 2″, 2-paddle agitator. In conducting the experiments to determine the various dissolution rates, both agitator speed and solvent temperature were varied. Results of these experiments are reported numerically in Tables 1, 2 and 3 and plotted graphically on FIGURE 1. Broken lines on the graph indicate extrapolation back to the vicinity of the beginning of turbulent flow within the reaction vessel.

TABLE 1.—EFFECT OF SOLVENT AGITATION WITH A 2″, 3-BLADE MARINE IMPELLER AGITATOR ON DISSOLUTION RATE OF PVC-VINYL ACETATE COPOLYMER CONTAMINANTS

| Agitator Speed, r.p.m. | Solvent Temperature, °C. | Dissolution Rate, Lbs./Hr./Ft.² |
|---|---|---|
| 0 | 20–22 | 0.0955 |
| 110 | 20–22 | 0.114 |
| 468 | 20–22 | 0.416 |
| 850 | 20–22 | 0.480 |
| 1,650 | 20–22 | 0.610 |
| 2,500 | 20–22 | 0.610 |
| 0 | 40 | 0.135 |
| 120 | 40 | 0.211 |
| 370 | 40 | 0.594 |
| 600 | 40 | 0.625 |
| 0 | 50 | 0.148 |
| 100 | 50 | 0.210 |
| 850 | 50 | 0.950 |
| 1,050 | 50 | 1.050 |

TABLE 2.—EFFECT OF SOLVENT AGITATION WITH A 2″, 3-BLADE MARINE IMPELLER AGITATOR ON DISSOLUTION RATE OF POLYVINYL CHLORIDE CONTAMINANTS

| Agitator Speed, r.p.m. | Solvent Temperature, °C. | Dissolution Rate, Lbs./Hr./Ft.² |
|---|---|---|
| 100 | 20 | 0.014 |
| 850 | 20 | 0.053 |
| 850 | 50 | 0.288 |
| 850 | 60 | 0.388 |

TABLE 3.—EFFECT OF SOLVENT AGITATION WITH A 2″, 3-BLADE MARINE IMPELLER AGITATOR ON DISSOLUTION RATE OF POLYVINYL CHLORIDE CHLORINATED POLYETHYLENE GRAFT COPOLYMER CONTAMINANTS

| Agitator Speed, r.p.m. | Solvent Temperature, °C. | Dissolution Rate, Lbs./Hr./Ft.² |
|---|---|---|
| 0 | 20 | Negligible |
| 100 | 20 | Negligible |
| 850 | 20 | 0.051 |
| 850 | 50 | 0.232 |

The second important variable is contaminant concentration in the solvent. From the general mass transfer equation, $$M = K(\Delta C)$$

where $M$ = mass flux, mass per unit time per unit area
$\Delta C$ = concentration difference, mass per unit volume
$K$ = overall mass transfer coefficient, length per unit time it is expected that an increase of the contaminant concentration in the solvent would decrease the dissolution rate of contaminant. This decrease is attributable to a lowering of the molecular diffusivity and an increase in the solvent viscosity. The actual effects of contaminant concentration were discerned as per the procedures set forth in Example II.

EXAMPLE II

Figure 2:
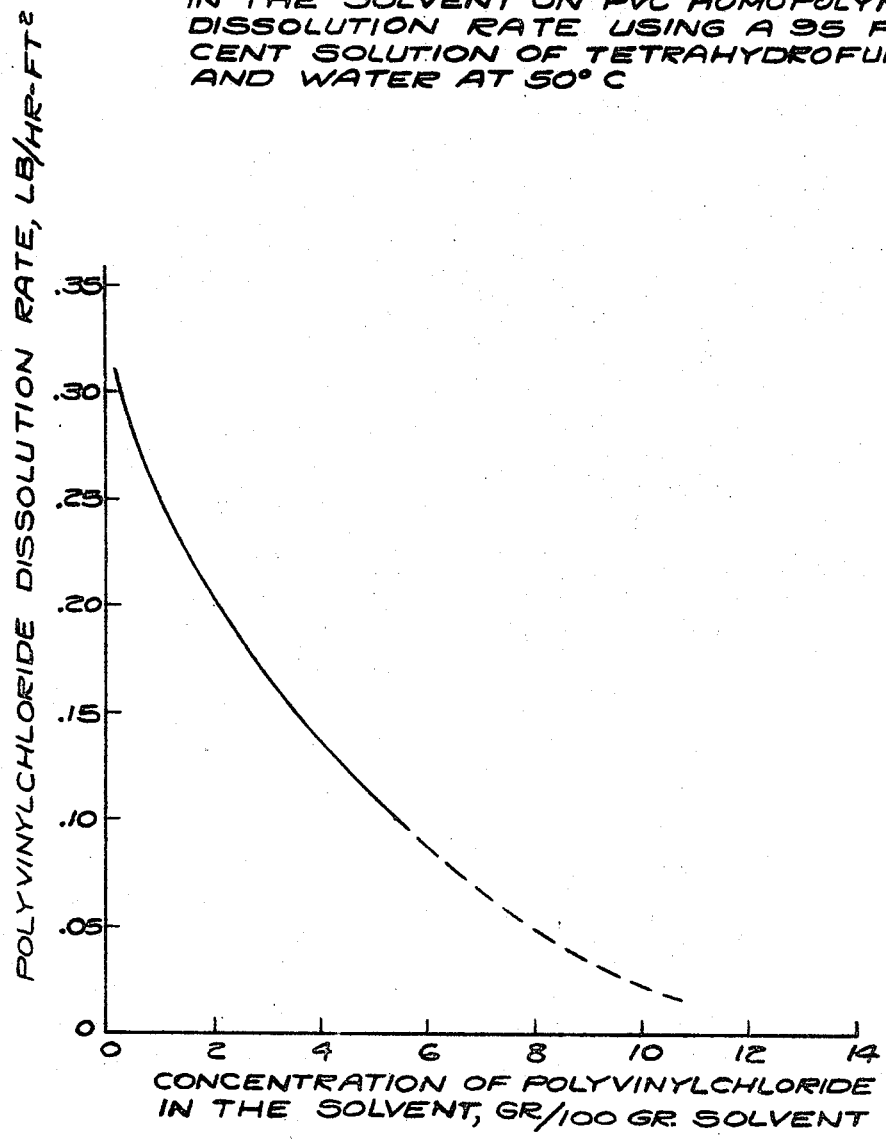
FIGURE 2 is a graphical representation of the effect of contaminant concentration in the solvent on polyvinyl chloride homopolymer dissolution rate using a 95% solution of tetrahydrofuran and water at 50° C.

To determine the effect of contaminant concentration on dissolution rate of contaminant in solvent, a 95% solution of tetrahydrofuran and water was agitated by a marine impeller at 850 r.p.m. in a 2000 milliliter beaker. Solvent temperature was held constant at 50° C. Polyvinyl chloride homopolymer and copolymer were dissolved in the solvent to the pre-determined concentration prior to the initiation of the dissolution rate tests. Data from these tests are numerically set forth in Table 4 and graphically in FIGURE 2.

TABLE 4.—EFFECT OF CONTAMINANT CONCENTRATION IN TETRAHYDROFURAN SOLVENT ON DISSOLUTION RATE AT 50° C. SOLVENT TEMPERATURE AND 850 R.P.M. AGITATOR SPEED

| Concentration of PVC In solvent, gm./100 gm. solvent: | PVC Homopolymer Dissolution Rate, lbs./hr./ft.$^2$ |
|---|---|
| 0–0.302 | 0.311 |
| 1.840–2.020 | 0.190 |
| 3.520–3.820 | 0.151 |
| 5.750–5.980 | 0.092 |

Figure 3:
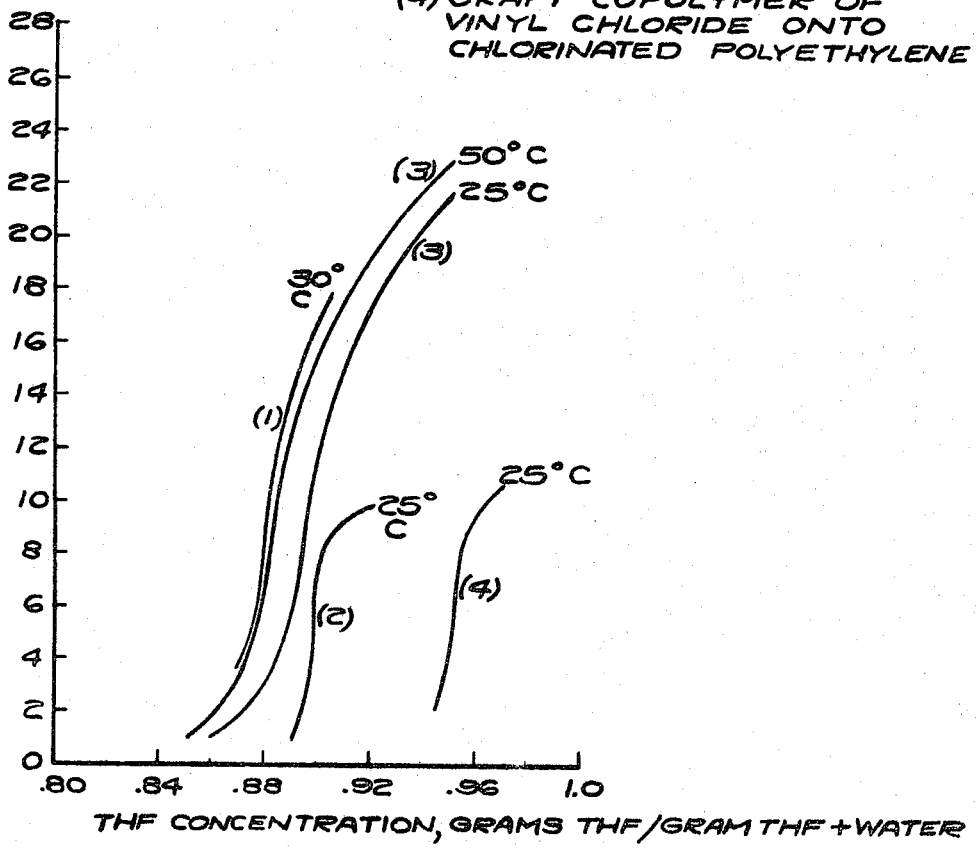
FIGURE 3 is a graphical representation of maximum solubility of various vinyl chloride resins in several different tetrahydrofuran-water solutions.

This third important variable is the concentration of the tetrahydrofuran-water solution and its effect on maximum solubility of the polymeric contaminants. Normally, the addition of water to a solvent decreases the maximum solubility of materials therein directly. It has been discovered, however, that the water addition to tetrahydrofuran does not so affect the maximum solubility of vinyl chloride polymers directly. Instead as set forth in the following example and FIGURE 3, it was surprising to find that up to a maximum of 10 percent water dilution did not appreciably affect the maximum solubility of vinyl chloride polymers in the tetrahydrofuran solution.

EXAMPLE III

Various vinyl chloride polymers, as set forth in Table 5, were dissolved in pure tetrahydrofuran until a grainy structure appeared throughout the solution. This point represents maximum solubility of the polymer in tetrahydrofuran. Equal portions of this saturated solution were then titrated with water to various tetrahydrofuran-water concentrations. The addition of water precipitated polymer and the precipitated polymer was removed, weighed and deducted from the dissolved polymer in the pure solvent to provide the maximum polymer solubility in the various concentration tetrahydrofuran solutions. Results for low molecular weight polyvinyl chloride homopolymer, high molecular weight polyvinyl chloride homopolymer, a copolymer of vinyl chloride and vinyl acetate, and a copolymer of vinyl chloride grafted onto chlorinated polyethylene are numerically reported in Table 5 and pictorially represented in FIGURE 3.

The present invention has alleviated the disadvantages known heretofore and is specifically described in the following example.

EXAMPLE IV

A 94% tetrahydrofuran-water solution was pumped from storage into a previously vacuum-purged polyvinyl chloride reaction kettle. The solvent prior to entry into the reactor is filtered and passed through a solvent heat exchanger where it was heated to a temperature of 90° C. The solvent was pumped into the reactor via a spray nozzle located in the dome of a reflux condenser. Sufficient solvent was pumped in until the reactor was completely filled and the solvent level in the reflux condenser was above the upper tube sheet. Shortly after the start of pumping of solvent into the reactor, the reactor agitator was started and was operated at speeds sufficient to provide turbulent flow within the reactor. While agitation continued, the solvent was continuously recycled through the reactor and reflux condenser for a period of two hours during which time the polyvinyl chloride contaminants were dissolved.

At the end of the two-hour period, the solvent having the polyvinyl chloride contaminants dissolved therein was discharged from the reactor and passed through a series of two heat exchangers which respectively reduced the temperature of the solvent to 38 and 24° C. As the solvent was being discharged from the reactor, low pressure nitrogen was added to the reactor to maintain a slight positive pressure. Following complete emptying of the reactor, the reactor surfaces were sprayed with cold uncontaminated tetrahydrofuran solvent to wash down residual contaminants left on the reactor walls. A fine mist of water was then sprayed into the reactor to collect any residual solvent vapor. All of the solvents previously discharged from the reactor were returned to storage and were reused for a second cleaning operation.

After the second cleaning operation, which was carried out identically with the one previously described, the discharged solvent was transported to solvent recovery for repurification of the tetrahydrofuran. In the solvent recovery, the tetrahydrofuran-water-polyvinyl chloride contaminants were preheated to 160° C. prior to entry into the still. As the heated tetrahydrofuran-water-polyvinnyl chlo- TABLE 5.—SOLUBILITY OF VARIOUS VINYL CHLORIDE RESINS IN TETRAHYDROFURAN-WATER SOLVENT

| | Maximum Solubility, gms. PVC/100 gms. THF | THF Concentration, gms. THF/100 gms. THF+H$_2$O | | | |
|---|---|---|---|---|---|
| | | 25°C. | 30°C. | 50°C. | 66°C. |
| Vinyl Chloride-Vinyl Acetate Copolymer | 20.6 | 93.8 | | 92.5 | |
| | 15.8 | 91.5 | | 90.5 | |
| | 9.6 | 89.4 | | 88.2 | 87.7 |
| | 7.6 | 89.4 | | 88.0 | |
| | 4.8 | 88.7 | | 87.3 | |
| | 0.9 | 85.8 | | 85.0 | |
| Low Molecular Weight Polyvinyl Chloride Homopolymer | 17.9 | | 90.3 | | |
| | 8.6 | | 87.9 | | |
| | 3.6 | | 86.9 | | |
| High Molecular Weight Polyvinyl chloride Homopolymer | 9.92 | 92.0 | | | |
| | 7.95 | 90.0 | | | |
| | 1.75 | 89.3 | | | |
| | 0.98 | 39.0 | | | |
| Graft Copolymer of Vinyl Chloride onto Chlorinated Polyethylene | 10.7 | 96.9 | | | |
| | 8.5 | 95.4 | | | |
| | 5.1 | 95.0 | | | |
| | 1.94 | 94.5 | | | |

Solvent temperature must likewise be considered but only from the standpoint of economics. An increase in solvent temperature increases the dissolution rate but creates problems both in handling and solvent recovery. It is, therefore, necessary that the solvent temperature be optimized to take advantage of the dissolution rate while simultaneously affording ease of handling and processability of the solvent and repurification. An optimum range of solvent temperature has been found to be from 80–100° C.

ride contaminant solution entered the still via a passed pressure reducing valve, a large portion of the tetrahydrofuran flashed off as a tetrahydrofuran-water azeotrope. In fact, 75% of the tetrahydrofuran (94–96% purity) was removed at this point as the azeotrope. The remaining solution collected in the bottom of the still. Overhead vapors from the continuous flash distillation were condensed in a vertical barometric condenser and were transported to a rinse solvent storage tank. The remaining solution in the still was then stripped by means of direct steam injection and the overhead vapors from the strip distillation (approximately 85% tetrahydrofuran) were condensed and transferred to solvent storage where the combined product was mixed with the overhead product from the flash distillation to produce a reuseable tetrahydrofuran solution of approximately 90% purity. Subsequent to the steam stripping, cold water was added to the still which cooled down the remaining water-polymer slurry. This slurry of water was precipitated polymer left in the still was then subjected to a separation process whereby the water was separated from the polymer contaminants and both constituents were discarded as waste.

It is envisioned that various modifications will readily occur to those skilled in the art which will be well within the scope of the present invention as defined in the appended claims.

What is claimed is:

1. A process for removing vinyl halide polymeric materials from processing equipment comprising contacting said polymeric materials with a solvent comprising on a 100 weight percent basis at least 90 percent tetrahydrofuran and up to about 10 percent water during continued agitation until said polymeric materials are dissolved in said solvent; discharging the solvent containing said dissolved polymeric materials from said processing equipment; and repurifying said tetrahydrofuran solvent.

2. The process of claim 1 wherein repurification of the tetrahydrofuran solvent is accomplished by means of vacuum distillation.

3. A process for removing vinyl halide residual polymeric materials from the internal surfaces of polymerization processing equipment comprising substantially filling said processing equipment with a solvent solution comprising on a 100 weight percent basis at least 90 percent tetrahydrofuran and up to about 10 percent water; agitating said solvent solution in the range of turbulent flow for a period sufficient to dissolve the said residual polymeric contaminants; discharging the said solvent solution having the said dissolved polymeric materials contained therein from said processing equipment; and subjecting said discharged solvent solution to vacuum distillation whereby said solvent solution is repurified to contain at least 90 percent tetrahydrofuran.

4. A process for cleaning internal surfaces of vinyl halide polymerization reactor vessels comprising substantially filling the reaction vessels with a solvent solution comprising on a 100 weight percent basis at least 90 percent tetrahydrofuran and up to about 10 percent water; agitating said solvent in the range of turbulent flow and continuing said agitation for a period of approximately 2 hours while maintaining said solvent solution at a temperature in the range of from 80–100° C., whereby residual vinyl halide polymeric materials from the inner surfaces of the reaction vessels are dissolved in the tetrahydrofuran solvent; emptying said reaction vessel; distilling the solution emptied from the reaction vessel by preheating said solution; flash distilling a portion of said solution and strip distilling the remaining portion of said solution by a direct steam injection method, whereby overhead vapors from said flash and said strip distillation steps contain at least 90 percent tetrahydrofuran.

References Cited

UNITED STATES PATENTS

| | | | |
|---|---|---|---|
| 2,288,588 | 6/1942 | Riecke et al. | 252—364 X |
| 2,541,380 | 2/1951 | Polly et al. | 252—364 X |
| 2,610,166 | 9/1952 | Parry et al. | 134—38 X |
| 2,749,313 | 6/1956 | Williams et al. | 134—38 X |
| 2,990,391 | 6/1961 | Grantham | 252—364 X |
| 3,189,553 | 6/1965 | Lange | 134—38 |
| 3,321,407 | 5/1967 | Rosenfeld | 134—38 X |
| 3,354,093 | 11/1967 | Early et al. | 252—364 X |

JOSEPH SCOVRONEK, Primary Examiner

U.S. Cl. X.R.

134—12, 22, 34, 38; 252—364